April 8, 1930.  G. FLINTERMANN  1,753,985
FLEXIBLE JOINT
Filed Feb. 18, 1926  3 Sheets-Sheet 1
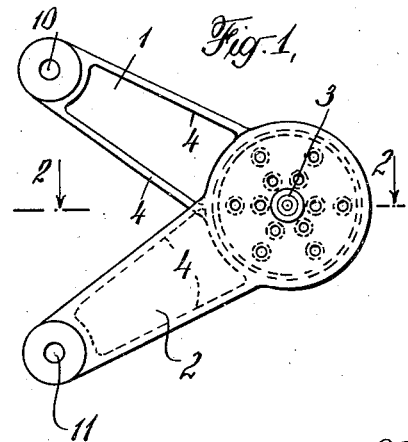
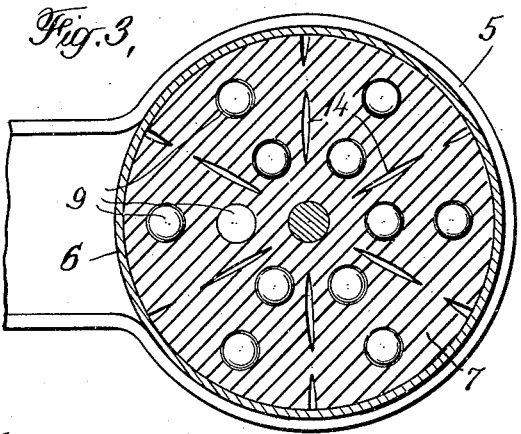
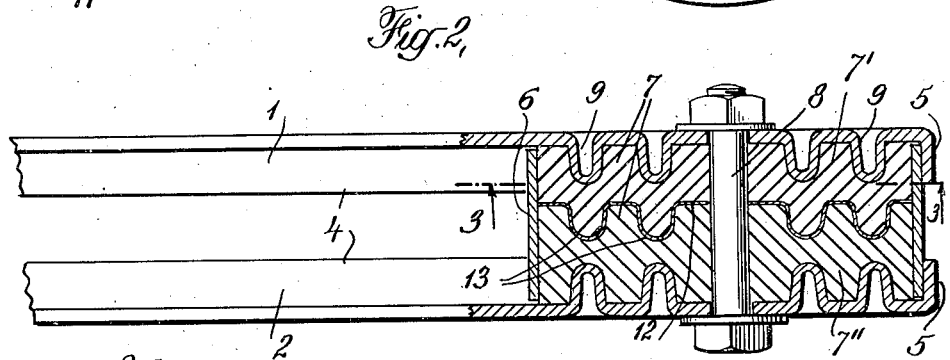
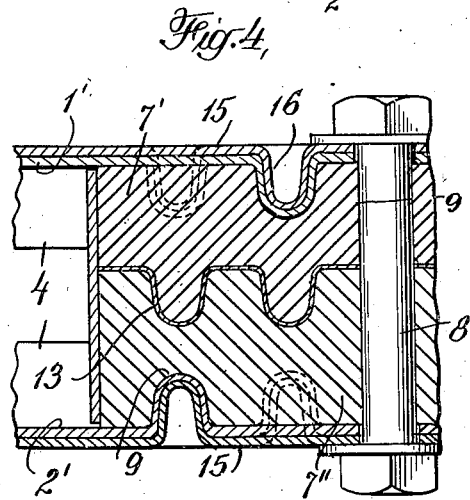
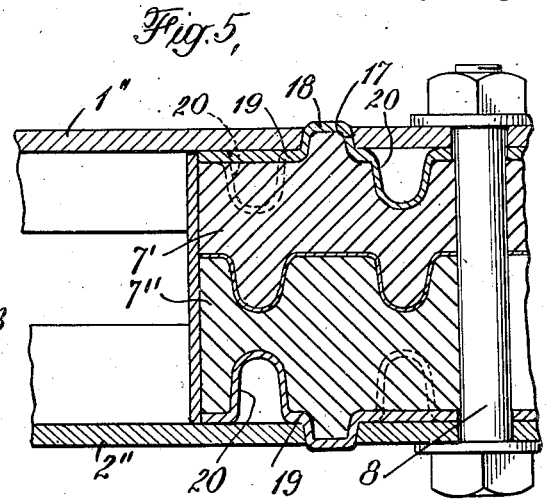
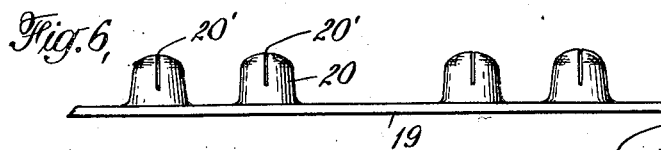
INVENTOR
Gerhard Flintermann
BY
ATTORNEYS

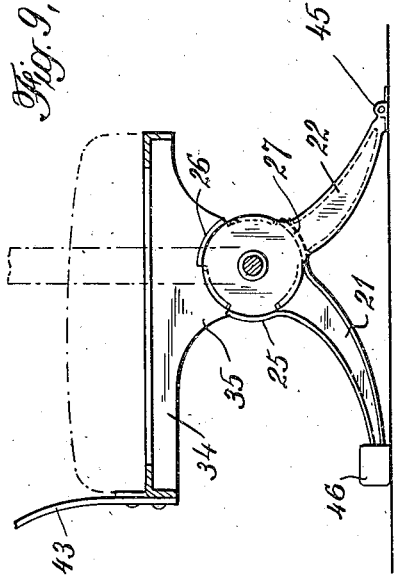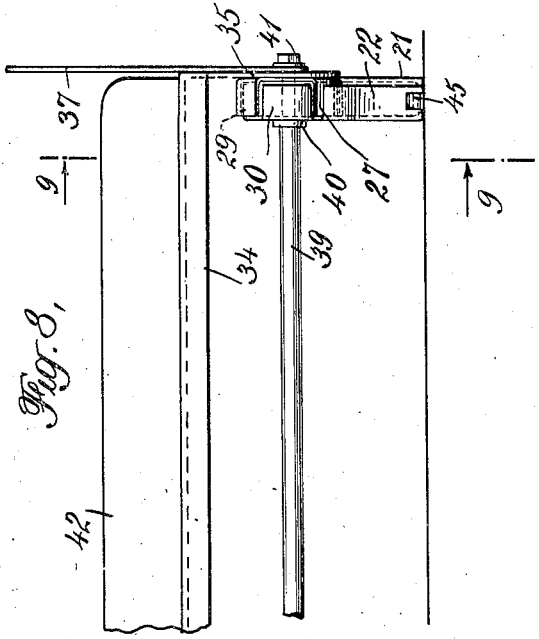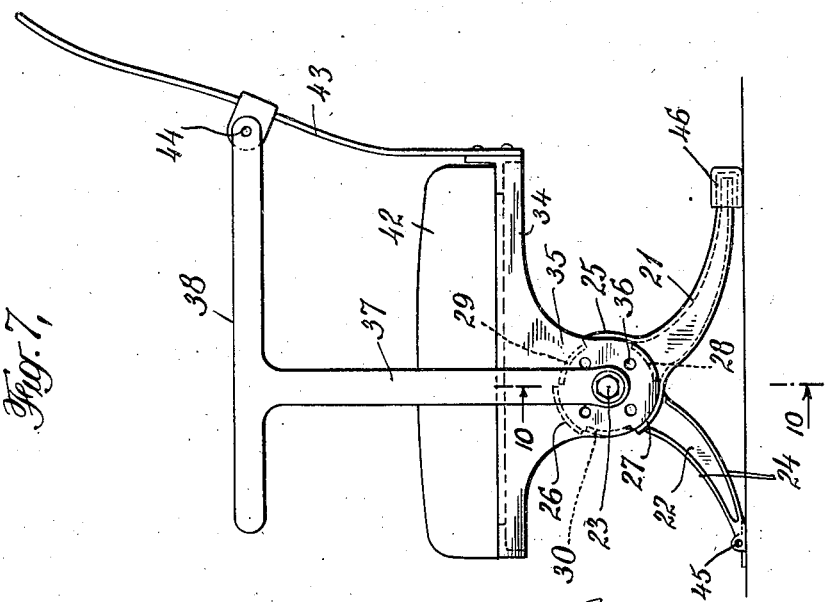

April 8, 1930. G. FLINTERMANN 1,753,985
FLEXIBLE JOINT
Filed Feb. 18, 1926 3 Sheets-Sheet 3
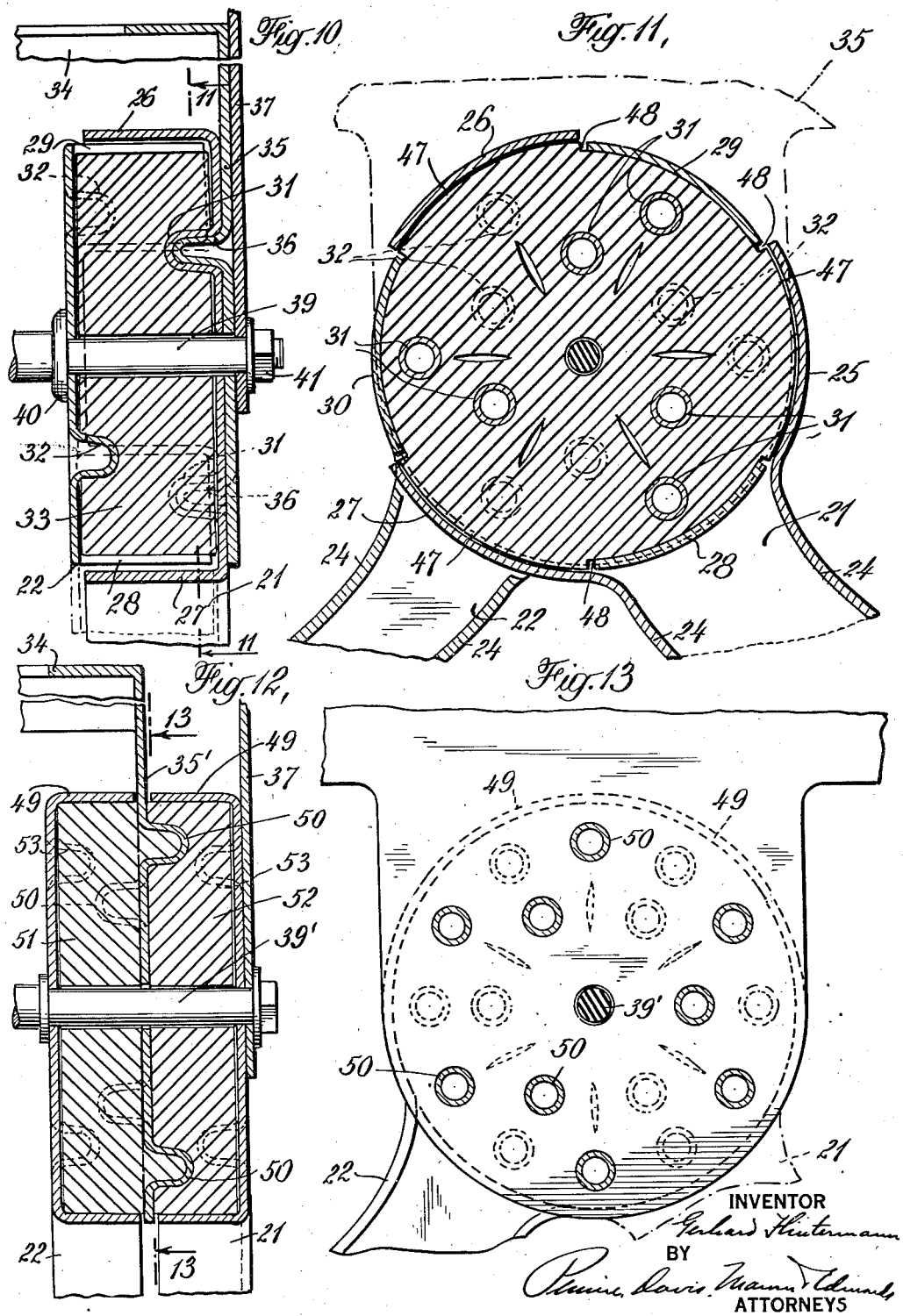
INVENTOR
Gerhard Flintermann
BY
ATTORNEYS Patented Apr. 8, 1930

1,753,985

UNITED STATES PATENT OFFICE

GERHARD FLINTERMANN, OF ORANGE, NEW JERSEY

FLEXIBLE JOINT

Application filed February 18, 1926. Serial No. 89,251.

This invention relates to improvements in flexible joints and has for its principal object to provide a flexible joint of simplified construction which is inexpensive to manufacture and which may be used in various relations where a flexible connection is desired between two members, such for instance as in shock absorbers for vehicles, in yielding or flexing supports for seats of railway cars, automobile buses and the like, and in various other relations hereinafter set forth.

Another object is to provide an improved flexibly supported seat.

The improved flexible joint is of that general type in which relative motion between two parts is yieldingly resisted by an intervening body of resilient or flexible material such as rubber, leather or the like. One advantage of this type of flexible joint is its simplicity of construction as it requires but few parts. According to this invention the advantage of simplicity is retained and in addition the cost of production is materially reduced by reason of the improved construction of the metallic parts and the manner in which they are associated with the intervening body of resilient or flexible material.

The accompanying drawings illustrate a number of modifications of the invention and a few applications of it.

In the drawings:—

Fig. 1 is a side elevation of a flexible joint which may be used substantially in the form illustrated as a shock absorber for vehicles, as a part of the suspension system for vehicles, and in various other relations;

Fig. 2 is a horizontal section taken on the line 2—2 of Fig. 1;

Fig. 3 is a section taken on the line 3—3 of Fig. 2;

Fig. 4 is a partial horizontal section corresponding with Fig. 2 but illustrating a modification;

Fig. 5 is a partial section corresponding with Fig. 2 illustrating a further modification;

Fig. 6 is a broken side elevation illustrating a modified form of projections which may be used on any of the metallic parts for interlocking the metallic parts together or for yieldingly connecting them to the intervening body of resilient material;

Fig. 7 is a side elevation of a seat intended for use on railway cars, automobile buses and the like showing the improved flexible joint applied thereto;

Fig. 8 is a front elevation of one end portion of the seat shown in Fig. 7;

Fig. 9 is a transverse section taken on the line 9—9 of Fig. 8;

Fig. 10 is a vertical section taken on the line 10—10 of Fig. 7;

Fig. 11 is a vertical section taken on the line 11—11 of Fig. 10;

Fig. 12 is a vertical section illustrating a modified manner in which the yielding or flexible joint may be associated with the seat, and Fig. 13 is a vertical section taken on the line 13—13 of Fig. 12.

Referring first to Figs. 1, 2 and 3 the flexible joint shown in these figures comprises two metallic members 1 and 2. These are represented as arms which are mounted for limiting relative movement with respect to each other about an axis 3. The shape and exact construction of the arms 1 and 2 will depend upon the specific use to which the flexible joint is to be placed. In the present instance these arms are so formed that the flexible joint may be used, for instance as a shock absorber on automobiles and the like, or as a part of the suspension system. In the former case the arms 1 and 2 may be connected between any two points on the vehicle where shock absorbers are usually used, for instance, the body and the spring or axle. When the flexible joint shown in Fig. 1 is used as a part of the suspension system one arm may be connected directly to the body and the other arm connected with the axle or a wheel without the intervention or use of the customary springs. Each of the arms 1 and 2 has side flanges 4 which terminate at one end of the arm in a circular flange 5. The two flanges 5 of the two arms confine between them a sleeve 6. A cylindrical block 7 of flexible or resilient material such as rubber, leather or the like occupies the space within the sleeve 6. A bolt 8 yieldingly clamps the two arms together to confine the sleeve 6 and the enclosed resilient block 7.

According to this invention the arms 1 and 2 are stamped or drawn metal, for instance steel. In forming the arms each of them is provided with a plurality of inwardly extending projections 9. These projections are formed by drawing or stamping the metal to give the projections substantially the configuration shown in the drawings. Preferably each of the projections is slightly tapered for the purpose hereinafter described. Any desired number of these projections may be provided. In the present instance two circular rows are employed with six projections in each row as shown in Fig. 3. If the metal is of such a character that these projections can be stamped or drawn while the metal is cold this course is preferably followed, but if necessary the metal may be heated and the projections 9 drawn or stamped while the metal is hot. The block of resilient material 7 is provided with corresponding tapered openings to receive the inwardly extending projections 9. It will now be seen that when the arms 1 and 2 are connected, for instance, at the points 10 and 11 to two parts which move toward or away from each other the arms 1 and 2 will tend to move relative to each other about the axis of the bolt 8. This movement is yieldingly resisted by the block of resilient material 7 due to the fact that each of the arms is provided with inwardly extending projections 9 engaging in the block of rubber. The block 7 may, if desired, be a composite one made up of two blocks 7′ and 7″ as shown in Fig. 2 with an intermediate thin metal plate 12 interposed between them. The plate 12 has projections 13 stamped or drawn thereon and the adjacent faces of the two blocks 7′ and 7″ are provided with the necessary projections and recesses to accommodate the irregular shape of the plate 12 and so that all the parts will fit together in the manner illustrated in Fig. 2. When the block 7 is in one solid piece it is subject near its central plane to certain stresses and these may be relieved by dividing the block into two parts and providing the intermediate plate 12 which assists in forming a yielding connection between the two portions of the blocks 7′ and 7″. The plate 12 may be made of thin brass or any other suitable metal. In order to increase the resiliency of the block 7 it may be provided with suitable openings 14 (Fig. 3) of any suitable shape, for instance the particular shape shown in the drawing. These openings allow the rubber to flow and also serve to dissipate heat which, if not carried away, may cause the rubber to deteriorate.

The stamping or drawing of the projections 9 and other parts of the arms 1 and 2 may be facilitated if these parts are made relatively thin. However, in making them thin their necessary strength may be sacrificed but this may be taken care of in the manner illustrated in Fig. 4. As shown in this figure the arms 1′ and 2′ are represented as being of less thickness than the corresponding arms in Figs. 1 to 3 inclusive and this will facilitate stamping or drawing of the projections 9, the flanges 4 and any other requisite parts projecting from the planes of the arms. The necessary strength is furnished by superposing on the arms 1′ and 2′ one or more additional plates having inwardly extending slightly tapered projections 16 stamped or drawn thereon which are adapted to be forced into the holes or openings at the reverse side of the projections 9 in the plates 1′ and 2′. The plates 15 may or may not be provided with flanges corresponding with the flanges 4. Preferably these plates are merely face plates having no side flanges and only cover the upper surfaces of the arms 1′ and 2′. In this way the arms may be given any required strength by using the necessary number of additional plates such as 15 and positioning all of the plates so that the projections on one plate fit in the recesses at the back of the projections on the adjoining plate. In this way the plates are locked or secured together without the use of additional fastening means such as rivets or the like. The requisite strength being furnished by using a number of plates, it is obvious that each plate, and also the arms 1′ and 2′ may be made as thin as desired to facilitate the stamping or drawing operation.

Fig. 5 represents the arms 1″ and 2″ (corresponding to the arms 1 and 2 of Fig. 1) as being quite thick in construction. Arms of this type may be used where it is desired to furnish the necessary strength in this way, but it would be difficult in this case to stamp or draw the projections 9 on the arms. In this event the arms 1″ and 2″ may be provided with tapered openings 17 adapted to receive with a force-fit outwardly extending slightly tapered projections 18 stamped or drawn on a relatively thin metal plate 19. The plate 19 is also provided with inwardly extending projections 20 adapted to engage in corresponding openings formed in the block portions 7′ and 7″. In this way the plates 19 are locked to the arms 1″ and 2″ and the projections 20 perform the same function as the projections 9 in the other figures and the effect is the same as if these projections were stamped directly on the arms 1″ and 2″.

In Figs. 4 and 5 the inwardly extending projections associated with one arm are staggered with respect to the inwardly extending projections on the opposite arm instead of being directly opposite each other as shown in Fig. 2. This staggering of the projections may be desirable to properly distribute the stresses to the block or blocks of rubber or the like.

Additional resiliency may be afforded by providing each of the inwardly extending projections with a slit or clearance 20' shown in Fig. 6. This will furnish a certain amount of resiliency in the projections themselves which will be added to and will augment the resiliency furnished by the block or blocks of resilient material placed between the two arms. This resiliency of the projections 20 also allows the rubber to flow.

The type of flexible joint shown in Figs. 1 to 6 inclusive may be used in substantially the form shown in these figures, as a shock absorber for vehicles or as a suspension member to connect the axle or a wheel to the body without the use of the customary springs. It may also be used in various other ways either in the exact form shown in Figs. 1 to 6 inclusive or with suitable changes. For instance, the arms 1 and 2 may have any suitable construction to adapt them for the particular purpose for which the flexible joint is to be used and they may be arranged at any suitable angle with respect to each other to suit the purpose at hand. The angularity between the arms 1 and 2 in Fig. 1 is substantially that employed in certain types of shock absorbers now used on vehicles.

Figs. 7 to 13 inclusive show several modifications of the invention as applied to the support of a seat which may be used on railway cars, automobile buses and the like. Referring first to Figs. 7 to 11 inclusive one of the supporting legs at one end of the seat, for instance, that shown at 21 may correspond in general with the arm 2 of the device shown in Fig. 1 and another leg, for instance, that shown at 22 may correspond with the arm 1 of the device shown in Fig. 1. The legs 21 and 22 are mounted for limited relative movement about the axis 23. By employing a flexible joint between the legs 21 and 22, similar to that shown in Fig. 1, it will be obvious that the seat will be yieldingly supported on the legs. Each of the legs may have side flanges 24 corresponding with the flanges 4 in Fig. 1. Instead of these flanges terminating in a continuous circular flange, as in the case of Fig. 1, they terminate in a series of circular flanges. For instance, the leg 21 is provided with the partial circular flanges 25, 26 and 27 and the leg 22 is provided with the partial circular flanges 28, 29 and 30. The flanges on one leg have a smaller radius than those on the other leg. For instance, the flanges 28, 29 and 30 of the leg 22 lie in a circle which occupies a position just inside of the circle in which the flanges 25, 26 and 27 lie. The two legs are positioned so that the flanges on one leg telescope with respect to the flanges on the other, as best shown in Figs. 8 and 10. However, the flanges on one leg are so located with respect to those on the other leg that in the normal position of the parts the flanges of one leg occupy and cover the open spaces between the flanges on the other leg. This is clearly shown in Fig. 11. Each leg is formed from stamped or drawn metal, as described above in connection with Fig. 1, and the leg 21 is provided with a series of inwardly extending projections 31, and the leg 22 is provided with a series of inwardly extending projections 32. These projections are stamped or drawn in the same manner as described in connection with Fig. 1. The spaces enclosed by the circular flanges of the two legs is filled with a block of resilient material, such as rubber, leather or the like, shown at 33. This block is provided with openings adapted to receive the projections 31 and 32. When the two legs are suitably held together, as for instance, in the manner hereinafter described, it is obvious that relative motion between them is yieldingly resisted as in the case of the arms 1 and 2 of Fig. 1. The flanges 25, 26, 27 and the flanges 28, 29, 30 being interrupted and not continuous are flexible to a certain degree and permit the rubber to flow.

The frame of the chair seat is represented at 34. At each end of the seat it has a downwardly extending projection 35 which may be provided with a series of inwardly extending projections 36. These may be stamped or drawn on the projections 35 and are of such size and so arranged that they will fit in the recesses at the back of the projections 31 (Fig. 10). The upright 37 of the arm 38 of the seat projects downwardly to the axis 23. At this point a bolt 39 passes through the lower end of the upright 37, through the projection 35, through the walls of the two legs and through the body of resilient material 33. All of the parts may be yieldingly clamped together between a shoulder 40 on the bolt and a nut 41 at the extremity of the bolt. The bolt 39 may extend entirely across the seat, and its other end may be utilized for supporting and clamping together those parts at the other end of the seat which correspond with the parts just described. The frame 34 of the chair seat may support a cushion 42 and a yielding back 43, may be suitably connected with the base frame 34 and pivotally connected with arms 38 at 44. By this arrangement it is obvious that when the back yields and is deflected backwardly the arm 38 and the upright 37 will pivot about the axis of the bolt 39.

It will now be seen that the weight of the seat and its occupant is transmitted to the legs 21 and 22 through the extensions 35 on the frame 34 and the projections 36 which constitute a part of the connection with one of the chair legs. These projections 36 also prevent the chair 34 from pivoting about the axis of the bolt 39. One of the chair legs at each end of the seat may be pivoted to the floor as shown at 45, and the other leg may fit into a socket 46 which permits a limited sliding movement of the leg, in order to allow the legs to move relative to each other about the axis 23.

Any weight on the seat is transmitted to the flexible joint by reason of the connection between the frame 34 and the flexible joint (the projections 36 fitting in the recesses at the back of the projections 31) and will tend to separate legs 21 and 22. This action is yieldingly resisted by the block 33 of resilient material.

The flanges 28, 29 and 30 on the leg 22 are preferably a little shorter than the corresponding spaces between the flanges 25, 26 and 27 on the leg 21 as shown in Fig. 11, and the block 33 is preferably provided with peripheral projections 47 which extend toward the flanges 25, 26 and 27, and each of about the same circumferential length as these flanges. This arrangement will provide a clearance 48 between each end of each of the flanges 28, 29 and 30, and the adjacent end of a projection 47 on the resilient block. After the legs 21 and 22 have deflected a predetermined amount one end of each of the flanges 28, 29 and 30 on the leg 21 will come in contact with one end of each of the projections 47 on the resilient block. This will yieldingly add to the resistance over by the resilient block and will act to more effectively resist and check further relative movement between the legs 21 and 22. In other words, the projections 47 act as resilient stops to yieldingly limit the relative movement of the legs 21 and 22 after they have moved a predetermined amount.

As shown in Figs. 10 and 11 the projections which engage in the openings in the resilient block are arranged in a different manner from the corresponding projections shown in Fig. 3. In Fig. 11 the projections 31 are arranged in two concentric circles with three projections in each circle, likewise, the projections 32 are arranged in two concentric circles with three projections in each circle, but the projections on the two legs alternate circumferentially, that is, a projection 32 lies between every two projections 31 and vice versa, and all the projections are so disposed that they are all substantially equal distances apart. This will serve, among other things, to properly distribute stresses to the different parts of the resilient block. In Figs. 12 and 13 the extension 35 on the chair frame 34 of Fig. 7 is replaced by an extension 35' which projects between the two leg members instead of being located at one side of the flexible joint. In this case each leg may be provided with a continuous circular flange 49 and the flanges need not telescope as in Fig. 11. That is, the circular flange 49 on the leg 21 projects toward but terminates at the intermediate plate 35', and that is also true of the circular flange on the leg 22. The parts are yieldingly bolted together by bolt 39', performing the same function as the bolt 39 of Fig. 10. The intermediate plate 35' is provided with stamped or drawn projections 50, some of which project toward the leg 22 and others project toward the leg 21. A block 51 of resilient material is positioned in the space between the leg 22 and the intermediate plate 35', and another block 52 of yielding material is positioned in the space between the plate 35' and the other leg 21. The legs 21 and 22 are provided with inwardly extending projections 53 as in the other forms of the device, and the blocks 51 and 52 are provided with openings to receive these projections and also the projections 50 on the plate 35'. It will now be seen that the chair frame 34 is supported on the flexible joint by means of the projections 50, and that relative motion between the leg 21 and the plate 35' is yieldingly resisted by the block 52, and the relative motion between the leg 22 and the plate 35' is yieldingly resisted by the block 51. The ultimate result is that the relative motion between the two legs 21 and 22 is yieldingly resisted. It will also be noted, that pivotal movement of chair seat about the axis of the bolt 39' is resisted by the projections 50 engaging in the blocks of yielding material, this being a yielding connection the pivotal movement of the seat about the bolt 39' is yieldingly resisted, and this tends to make the seat more comfortable.

As stated above all the projections which are intended to engage in openings in the resilient block are preferably given such a shape, when they are stamped or drawn, that they have a slight taper as shown in the drawings, and the corresponding openings in the resilient block are correspondingly tapered. This improves the resilent character of the joint and allows the proper flexing.

Practically all of the metal parts of the improved flexible joint are stamped or drawn, and therefore, the expense involved in manufacturing a joint of this type is greatly reduced. The joint is simple in construction and highly efficient for the purposes described. Practically all of the connections between adjoining parts are made by the stamped tapered projections fitting in the corresponding tapered pockets or openings adapted to receive them. That is, the connections between the resilient block and the adjacent metallic parts are made by the stamped projections on the metal parts fitting in the corresponding openings in the resilient member and in most instances where two metallic members are in adjoining relation and connected together, the connection is effected by forcing the two metal members together under pressure so that the tapered projections on one metal member are forced into and interlock with the tapered openings on the adjoining metal member. This eliminates the necessity of any additional fastening means such as rivets and the like and greatly simplifies the construction. In addition to the uses specifically mentioned above, the flexible joint, with appropriate structural changes, may also be used as a spring shackle, as any kind of a vibration absorber and as a flexible coupling for rotary shafts. It may also be used as a part of a bumper or fender for vehicles, as a part of a bed spring support, as a part of a motor cycle seat or it may be used to connect parts to deaden the transmission of sound. The use of the flexible joint in connection with a seat as herein disclosed results in an improved seat construction which also forms a part of this invention.

I claim:

1. A flexible joint comprising two relatively movable members, an intervening body of flexible material, each of said members being a metal stamping having projections drawn or stamped thereon and extending toward said body of flexible material, said body of flexible material having openings to receive said projections, and at least one metallic reinforcing plate adjoining at least one of said members, said plate having projections stamped thereon engaging in the recesses at the back of the projections on said member.

2. A flexible joint comprising two relatively movable members and an intervening body of flexible material, each of said members being a metal stamping having tapered cylindrical projections drawn or stamped thereon and extending toward said body of flexible material, said body of flexible material having openings adapted to receive said projections, and each of said members having at least one superposed reinforcing metallic plate having tapered cylindrical projections stamped or drawn thereon and forced in the recesses at the back of the projections on said member.

3. A flexible joint comprising a body of flexible material and at least two metallic members on each side thereof, one of said members on each side of the body of flexible material having projections stamped thereon extending toward and engaging in the body of flexible material and the two members on each side of the body of flexible material having interlocking projections and recesses for the purpose described.

4. A flexible joint comprising a body of flexible material and at least two metallic members on each side thereof, one of said members on each side of the body of flexible material having projections stamped thereon extending toward and engaging in the body of flexible material and the two members on each side of the body of flexible material having interlocking tapered projections and recesses for the purpose described.

5. A flexible joint comprising two relatively movable members, an intermediate plate located between said members and dividing the space between them into two compartments, a body of flexible material in each compartment, projections on each member extending toward and engaging in one of said bodies of flexible material, and hollow projections on said intermediate plate interlocking with said bodies of flexible material.

6. A flexible joint comprising two relatively movable members, an intermediate plate located between said members and dividing the space between them into two compartments, a body of flexible material in each compartment, and projectionss on each member extending toward and engaging in one of said bodies of flexible material, said intermediate plate and the two adjacent bodies of flexible material having inter-engaging projections and recesses for the purpose described.

7. A flexible joint comprising two relatively movable members, an intermediate partition located between said members and dividing the space between them into two compartments, a body of flexible material in each compartment, and projections on each member extending toward and engaging in one of said bodies of flexible material, said partition and the two adjacent bodies of flexible material having interengaging projections and recesses for the purpose described.

In testimony whereof I affix my signature.

GERHARD FLINTERMANN.